United States Patent [19]

Tsuji

[11] Patent Number: 4,928,902
[45] Date of Patent: May 29, 1990

[54] VEHICLE SEAT BELT RETRACTOR

[75] Inventor: Yasuo Tsuji, Shiga, Japan

[73] Assignee: Takata Corporation, Tokyo, Japan

[21] Appl. No.: 384,981

[22] Filed: Jul. 25, 1989

[30] Foreign Application Priority Data

Jul. 27, 1988 [JP] Japan .................. 63-185522

[51] Int. Cl.⁵ .................... B60R 22/38; B60R 22/40; B60R 22/42
[52] U.S. Cl. .................. 242/107.2; 242/107.4 A; 242/107.4 B
[58] Field of Search ............ 242/107.2, 107.4 A, 242/107.4 B, 107.4 C; 280/806, 808; 297/478, 480

[56] References Cited

U.S. PATENT DOCUMENTS

| 3,504,867 | 4/1970  | Stevenson      | 242/107.2   |
|-----------|---------|----------------|-------------|
| 4,241,886 | 12/1980 | Maekawa et al. | 242/107.2   |
| 4,243,185 | 1/1981  | Motonami et al.| 242/107.2   |
| 4,249,708 | 2/1981  | Asano          | 242/107.2   |
| 4,323,204 | 4/1983  | Takada         | 242/107.2   |
| 4,403,751 | 9/1983  | Asano          | 242/107.2   |
| 4,544,112 | 10/1985 | Ziv            | 242/107.2   |
| 4,687,253 | 8/1987  | Ernst et al.   | 242/107.2 X |

FOREIGN PATENT DOCUMENTS 3539280  5/1987  Fed. Rep. of Germany ... 242/107.2

Primary Examiner—John M. Jillions
Attorney, Agent, or Firm—Brumbaugh, Graves, Donohue & Raymond

[57] ABSTRACT

A vehicle seat belt retractor comprises an emergency locking mechanism that responds to either rapid acceleration of the vehicle or rapid acceleration of the belt reel and a belt clamp that is actuated by a small rotation of the belt reel via a link that engages a ratchet wheel affixed to the belt reel. The link is moved into engagement with the ratchet wheel by camming action by a reel-locking pawl, which, in turn, is moved in response to activation of the emergency locking mechanism.

5 Claims, 7 Drawing Sheets

VEHICLE SEAT BELT RETRACTOR

BACKGROUND OF THE INVENTION

Nearly all motor vehicles produced within the past few years have been equipped with seat belt retractors of the emergency locking type ("ELR"), i.e., of the type that allows the belt to be withdrawn at all times other than when an emergency locking mechanism responds to rapid acceleration (most commonly negative acceleration) of the vehicle or rapid rotational acceleration of the belt reel. ELR's have the advantage of allowing the occupant to lean forward.

It is known that even though the locking mechanism of an ELR, when activated, stops the belt reel from rotating in the unwinding direction, a small length of belt may be pulled from the reel due to tightening of the loops of the belt that remains wound on the reel. It has, accordingly, been proposed to provide a belt clamp to keep the belt from being unwound by tightening on the retractor reel. Examples of belt clamps for restricting pull-out from the reel of the segment of the belt that restrains the occupant are found in U.S. Pat. Nos. 4,544,112 (Ziv, 1985), 4,323,204 (Takada, 1982), 4,243,185 (Montonami et al., 1981) and 4,687,253 (Ernst et al., 1987).

Japanese Published Application No. 55-12923 (1980) describes and shows an ELR equipped with a belt clamp mechanism that is linked to and operated by an actuating plate that also engages a reel-locking bar with a main locking ratchet wheel affixed to the belt reel. A pendulum type inertia sensor moves the slidably mounted actuator plate upwardly when activated. A tooth on the plate is thereupon engaged by a secondary ratchet wheel that rotates with the reel. Upon a small amount of rotation of the reel, the actuating plate pivots the reel-locking bar into engagement with the reel and also pushes up on a link, which is coupled to a lever having a clamping jaw on its free end. The lever, which is normally biassed by a spring to an inactive position, is pivoted up to clamp the belt against a part of the frame and arrest its movement. The design has two main shortcomings. First, the pendulum inertia sensor is called up to act against the mass of the actuator plate, the link and the clamp lever, the force of the lever-biassing spring, and the friction of these several components and the sliding and pivoting mounts. This requires a comparatively large, heavy pendulum, and also introduces a high degree of imprecision in the sensitivity of the inertia sensor, particularly due to large friction effects which are somewhat unpredictable. Second, the design is limited to response to vehicle acceleration and is not suited to the presently preferred designs of ELR's which incorporate mechanisms that respond to both vehicle acceleration and belt reel acceleration. In addition the design of the belt clamp of Japanese Published Application No. 55-12923 is subject to diminishing effectiveness as the belt wears, because it relies on friction of the belt against a plain frame wall to restrain the belt.

SUMMARY OF THE INVENTION

One object of the present invention is to provide a vehicle seat belt retractor in which a belt clamp is actuated by a small rotation of the reel transmitted from the reel to the belt clamp by the main locking ratchet wheel, the actuation of the belt clamp being initiated by the emergency locking mechanism in a manner that does not involve the acceleration sensing elements and does not, therefore, effect the sensitivities of such elements. Another object is to provide a retractor having an emergency locking mechanism that locks the reel against rotation in response to either vehicle acceleration or belt reel acceleration in which the emergency locking mechanism initiates the operation of a belt clamp as well as locking of the reel but in which the initiation of locking of the reel is totally uneffected by the interaction of the reel locking mechanism and the belt clamp. Still another object is to provide a belt retractor with a built-in belt clamp that retains its reliability and effectiveness over a long service life.

The foregoing and other objects are attained, according to the present invention, by a vehicle seat belt retractor having a frame, a belt reel rotatably mounted on the frame, an emergency locking mechanism for locking the belt reel to the frame against rotation in the belt-unwinding direction in response to rapid acceleration of the vehicle and including a reel-locking pawl pivotably mounted on the frame for engagement with a ratchet wheel affixed to the belt reel and an actuator plate coupled to the pawl and movable in response to rotation of the belt reel in the belt-unwinding direction upon operation of the emergency locking mechanism to cause the reel-locking pawl to engage the ratchet wheel, and a belt-clamping mechanism including a fixed clamping member mounted on the frame and a movable clamping member carried on a lever arm mounted on the frame for pivotal movement between an inactive position in which the clamping members are spaced apart such that the belt can pass freely between them and a clamping position in which the movable clamping member clamps the belt against the fixed clamping member and prevents it from moving, and a link pivotably coupled to the lever arm and controlling the movements of the lever arm between the inactive and clamping positions. The invention is characterized in that the link is pivotably attached to the frame such as to form with the lever arm a compound lever, in that the link includes a projection selectively engageable with the ratchet wheel, and in that the link is resiliently biassed to engage a cam follower portion thereof with a cam surface of the reel-locking pawl such that the link is pivoted in response to movement of the reel-locking pawl into engagement with the ratchet wheel by a camming action of the cam surface and cam follower portion to engage the projection of the link with the ratchet wheel, whereby the rotation of the ratchet wheel in the belt-unwinding direction causes the link to pivot about its pivot mounting on the frame and to move the lever arm and movable clamping member to the clamping position.

In a preferred embodiment, the invention is further characterized in that the actuator plate is mounted for rotation coaxially with the axis of rotation of the belt reel, in that the actuator plate includes a cam slot and in that the reel-locking pawl has a cam follower pin received in the cam slot of the actuator plate, whereby movements of the reel-locking pawl are controlled by rotational movements of the actuator plate, and in that the actuator plate is resiliently biassed in a direction to hold the reel-locking pawl out of engagement with the ratchet wheel.

The link mechanism may include a link member pivotably mounted on the frame and pivotably coupled to the lever arm and a separate cam follower member pivotably mounted on the link member. The link may also be a unitary member mounted on the frame to translate toward the fixed clamping member and away from the axis of rotation of the belt reel and coupled to the lever arm to translate relative to the lever member toward the fixed clamping jaw and away from the axis of rotation of the belt reel in response to the camming action of the main locking pawl.

For a better understanding of the invention reference may be made to the following description of exemplary embodiments, taken in conjunction with the accompanying drawings.

DESCRIPTION OF THE EMBODIMENTS

Figure 2:
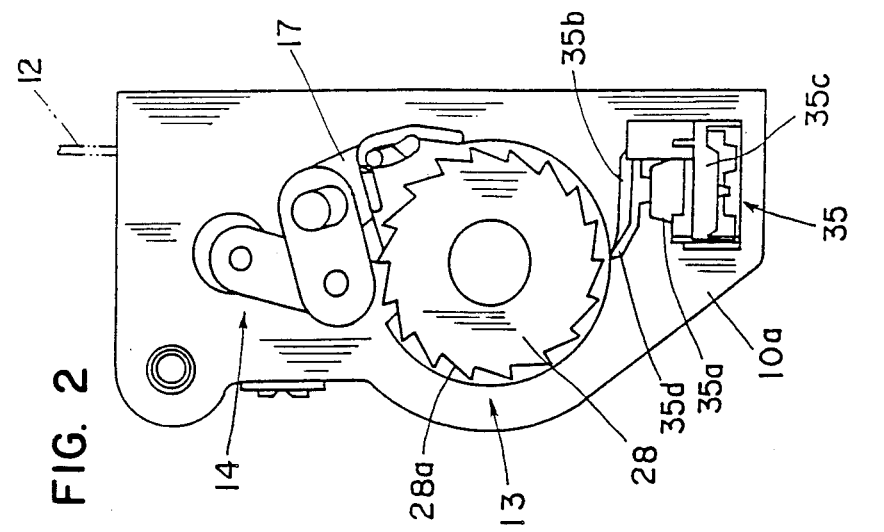
FIG. 2 is a simplified side elevational view of the first embodiment.
Figure 1:
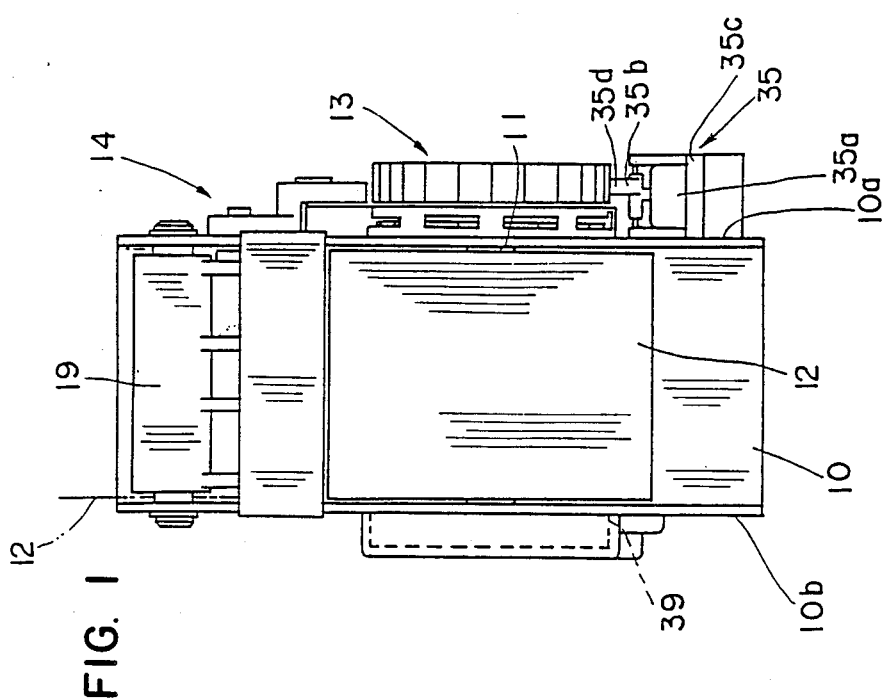
FIG. 1 is a front elevational view of a first embodiment of the invention.
Figure 3:
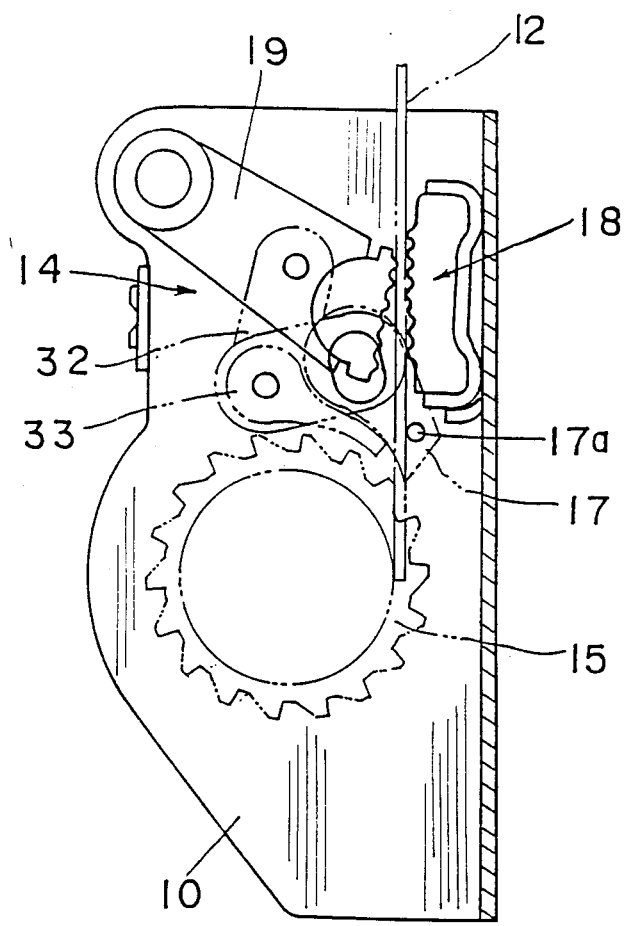
FIG. 3 is a side cross-sectional view of the first embodiment, the view also being simplified and the section being taken just inside the near frame.

Referring to FIGS. 1 to 3, the retractor comprises a U-shaped frame 1 having side wall portions 10a, 10b in which a reel shaft 11 is mounted for rotation. The shaft 11 receives a belt reel onto which a belt 12 is wound. An emergency locking mechanism 13 operates in response to rapid acceleration of the vehicle or rapid acceleration of the belt reel to lock the reel to the frame against rotation in the belt-unwinding direction. To prevent a length of belt from being pulled from the reel when it is locked, due to tightening of the loops of belt that remain on the reel, a belt clamp 14 is built into the retractor.

Figure 4:
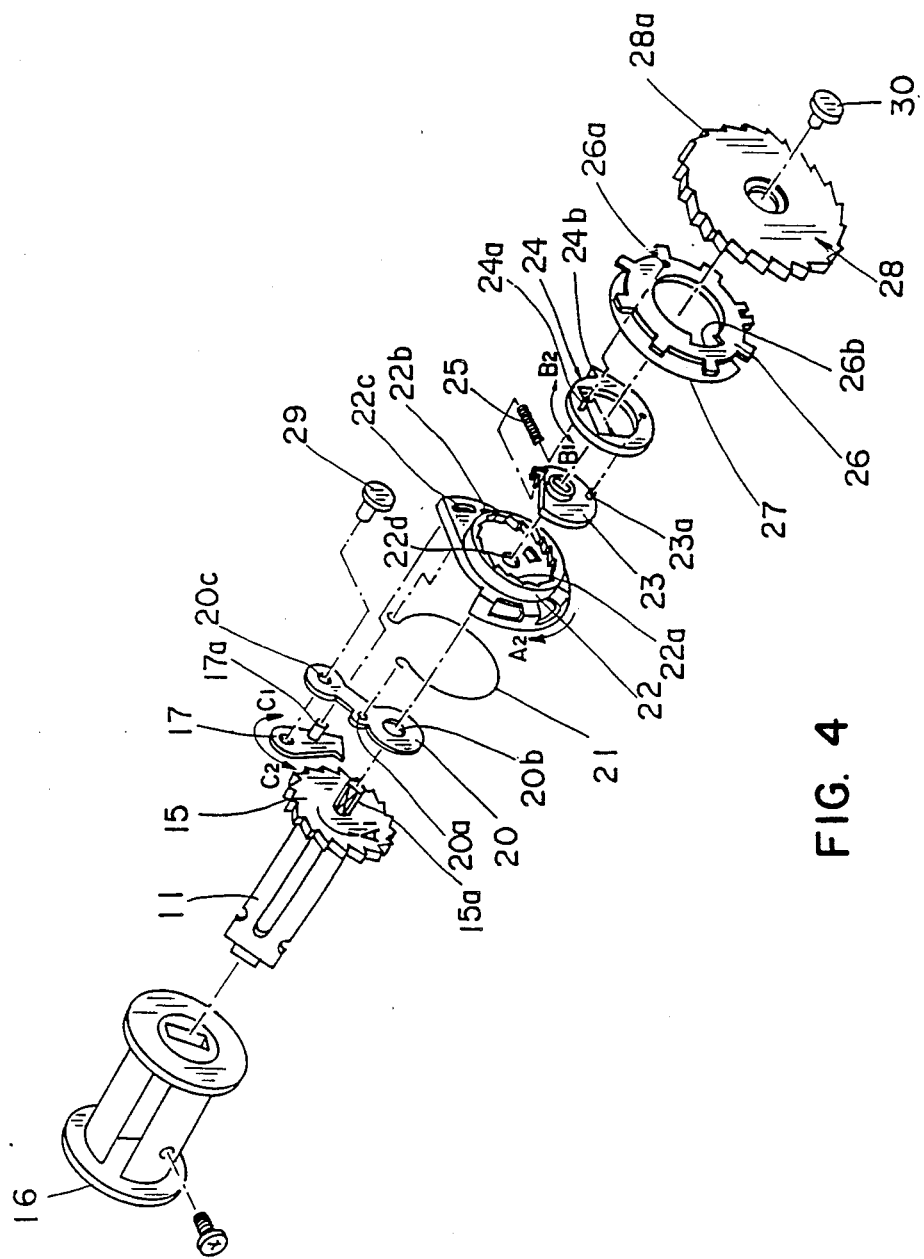
FIG. 4 is an exploded pictorial view of the emergency locking mechanism.

The emergency locking mechanism 13 is similar in many respects to the mechanism described and shown in Takada U.S. Pat. No. 4,564,154 (Jan. 14, 1986) and its counterpart DE OS No. 33 40 938 (May 24, 1984), which are hereby incorporated by this reference to them into the present specification. The mechanism 13 is shown in FIG. 4. The shaft 11 receives a belt reel 16 onto which the belt is wound at the urging of a spiral winding spring 39 (see FIG. 1) housed under a cover outside of the frame side wall 10b. A ratchet wheel 15 is affixed to the shaft 11 outside the frame side wall 10a. A shaft extension 15a receives, in order moving away from the frame, the hole 20b of a tie plate 20, the hole 22d of an actuator wheel 22, a hook carrier disc 23, and an inertia wheel 28. The shaft extension 15a rotates relative to the tie plate 20, the actuator wheel 22 and the inertia wheel 28; the carrier disc 23 is non-rotatably affixed to the extension 15a for rotation with the shaft 11. A retainer element 30 received in the shaft extension 15a holds the components of the mechanism in place axially.

Pivotably mounted by a pin 29 on the frame side wall 10a is a reel-locking pawl 17. To insure that the pin 29 does not bend, the pin 29 passes through a hole 20c in the tie plate 20; accordingly, the pawl 17 is straddled by the frame side 10a and the tie plate 20 and is thereby strongly supported.

A cam follower pin 17a projects from the pawl 17 and is received in a cam slot 22c in the actuator wheel 22. The actuator wheel is biassed clockwise (arrow A2) by a spring 21 that is coupled between a hole 20a in the tie plate and a hole 22b in the actuator wheel 22. Accordingly, the pawl 17 is normally held in an inactive position away from the teeth of the main ratchet wheel 15 by interaction of the follower pin 17a and the cam slot 22c.

A hook member 24 is mounted for pivotal movement on a pivot pin 23a projecting out from the hook carrier disc 23 and is biassed by a compression inertia spring 25 engaged between it and the carrier disc to an inactive state in which a hook or tooth 24b on the hook member 24 is clear of engagement with a circular row of internal teeth 22a on the actuator wheel 22. A pin 24a extending out from the hook member 24 is pivotably received in a hole 26a in a friction clutch ring 26. A notch 26b in the ring 26 provides clearance space for the tip of the pin 23a, which protrudes through the hook member 24.

Figures 5, 6:
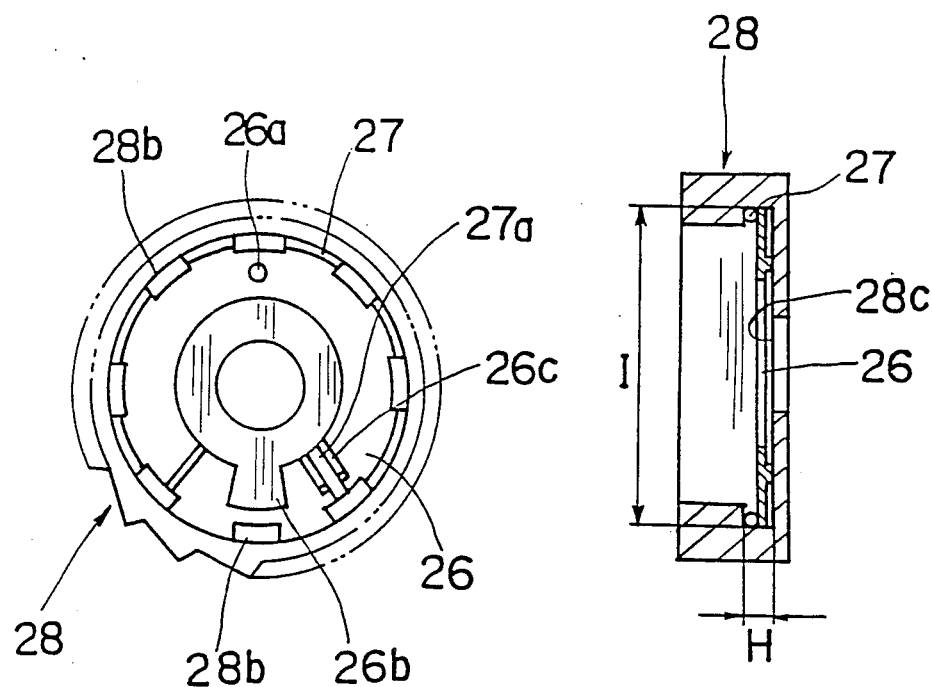
FIGS. 5 and 6 are elevational and transverse cross-sectional views, respectively, of a subassembly consisting of the inertial wheel and a friction clutch of the locking mechanism.

Referring to FIGS. 5 and 6, the friction clutch ring is received adjacent the transverse wall portion of the inertia wheel 28 and is held in place by a friction spring 27, one end 27a of which is held fixed between receiving ribs 26c on the ring 26. The spring 27, in turn, is captured under ribs 28b within the larger diameter portion I of the peripheral flange portion of the inertia wheel 28. The space H is sufficient to freely accept the friction clutch ring 26 and the spring 27. The spring is biassed outwardly to frictionally engage the flange portion of the inertia wheel. The purpose of the friction clutch ring 26 and spring 27 is to couple the hook member 24 to the inertia wheel 28 (via the pin 24a) in a manner that allows limited rotation of the inertia wheel relative to the hook member. In this way the need for close manufacturing and assembly tolerances is not needed to maintain proper timing between the ratchet teeth 28a on the inertia wheel and the ratchet teeth 22a on the actuator disc. The inertia wheel, when locked by the inertia sensor pawl (35b, described below) will slip enough relative to the friction clutch ring 26 when the hook member tooth 24b engages one of the actuator wheel teeth 22a to prevent overloading the inertia sensor pawl 35b, if necessary, when the tooth 24b of the hook member 24 engages a ratchet tooth 22a of the actuator wheel 22.

Returning again to FIG. 4, when the belt is pulled out rapidly, such as when the occupant is thrown forward in an emergency stop or a collision, the hook carrier disc 23 is abruptly accelerated counterclockwise (arrow B1). Thereupon, the inertia of the hook number 24, clutch ring 26 and inertia wheel produce an inertia force that causes them to lag behind rotationally the hook carrier disc 23, thereby causing the hook member 24 to pivot about the pin 23a against the force of the inertia spring 25 in the direction B2. The tooth 24b of the hook member engages one of the ratchet teeth 22a of the actuator wheel, which in turn rotates the actuator member counterclockwise, the counterclockwise (belt-unwinding) rotation of reel shaft being transmitted from the carrier disc 23 by the pin 23a to the hook member 24 and by the hook member to the actuator wheel 22. The camming action of the cam slot 22c on the cam pin 17a pivots the reel-locking pawl 17 clockwise (arrow C1) such as to engage the pawl with the main locking ratchet wheel 15.

Figure 8:
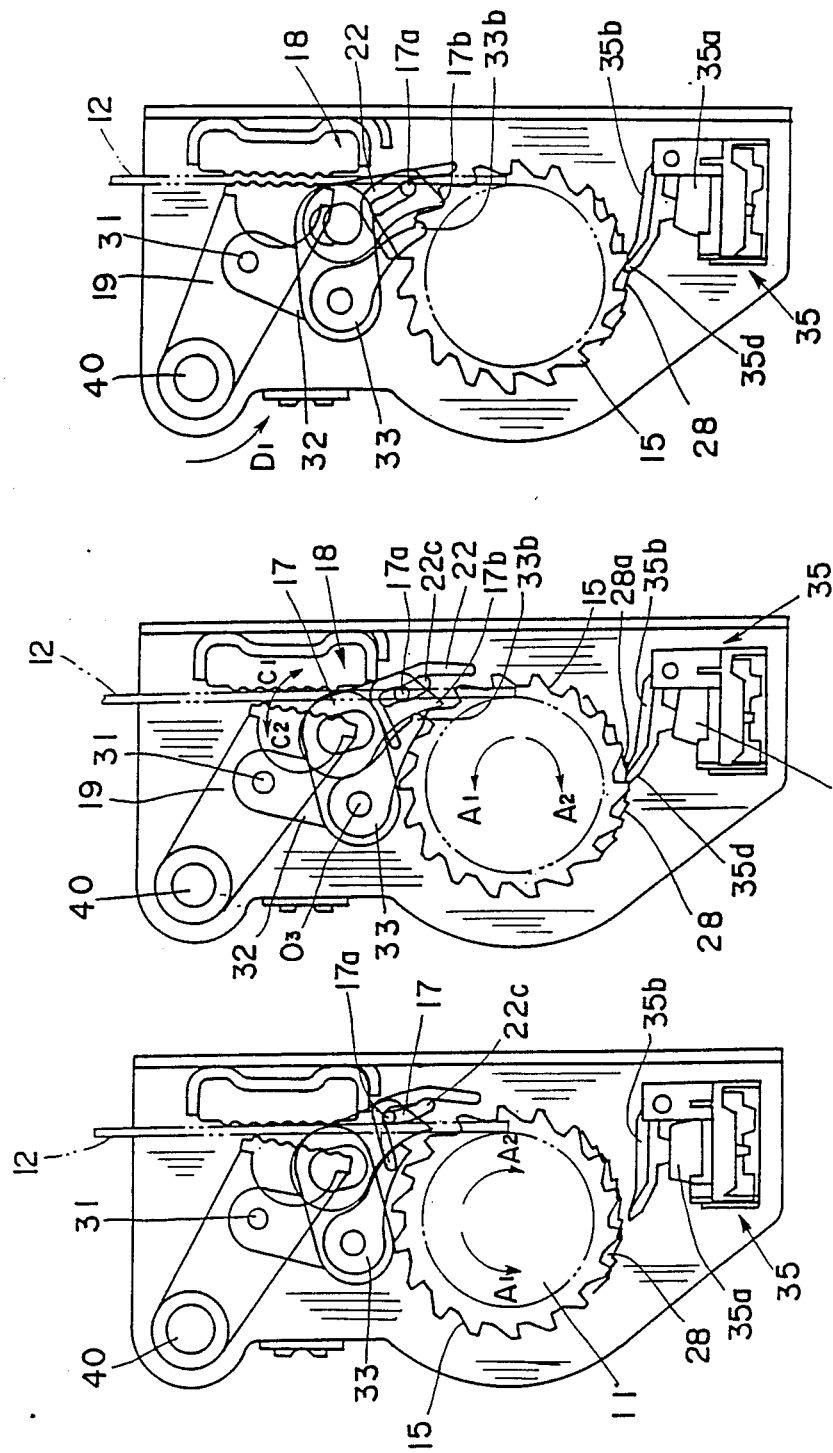
FIGS. 8A, 8B and 8C are side elevational views of the first embodiment at different stages of its operation.

The sequence of events just described is also brought about in response to rapid acceleration (positive or negative) of the vehicle. An inertia sensor 35 (see FIGS. 8A, 8B, 8C) having an inertia mass 35a working by a cam surface on its upper end against a follower projection on a pivotable inertia sensor pawl 35b operates to engage the pawl tip 35d with one of the ratchet teeth 28a on the outer perimeter of the flange portion of the inertia wheel 28. The stopping of the inertia wheel 28 causes the hook member 24 to pivot and engage the actuator wheel 22.

The initiation of locking of the belt reel against rotation in response to rapid acceleration of the belt reel or rapid acceleration of the vehicle occurs as described above in the same way as a retractor without a belt clamp. In other words the sensing of reel acceleration and vehicle acceleration and locking of the reel shaft to the actuator wheel occurs independently of the belt clamp and is altogether uneffected by the presence of the belt clamp. Thus, there is complete predictability of the sensitivity of the emergency locking mechanism and reliability of its functioning.

Figure 7:
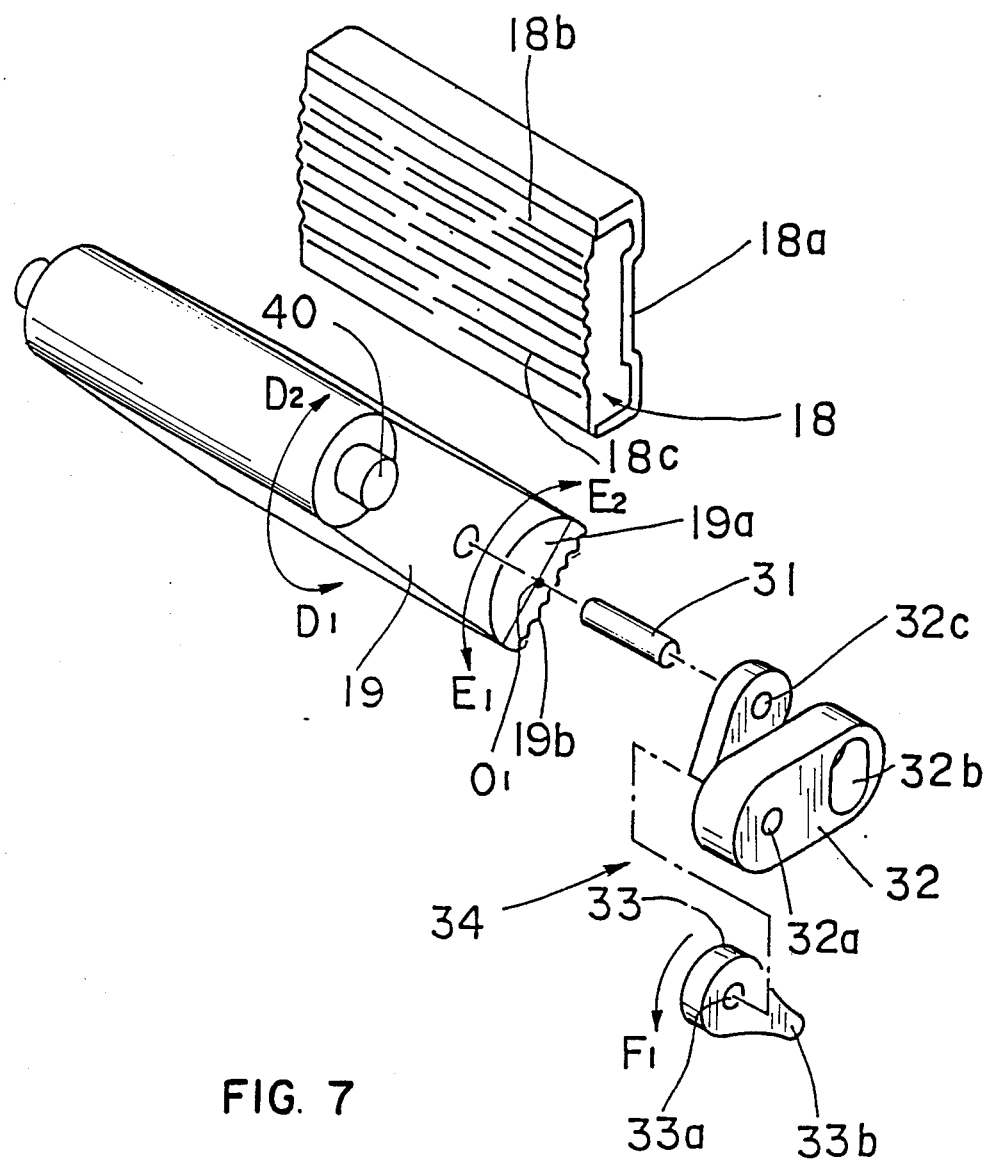
FIG. 7 is an exploded pictorial view of the belt clamp mechanism of the first embodiment.

Referring next to FIGS. 2, 3 and 7, the belt clamp 14 comprises a fixed clamping member 18 consisting of a channel-shaped carrier 18a suitably fastened to the base wall of the retractor frame 1 and receiving a clamping jaw member 18b having a series of smoothly curved transverse teeth 18c forming a corrugated surface. A lever arm 19 is pivotably mounted by an axle 40 in the frame side walls 10a, 10b and is biassed clockwise (arrow D2) relative to the frame to an inactive position in which a movable clamping jaw member 19a is spaced apart from the fixed clamping jaw. The clamping jaw member 19a has a corrugated clamping surface 19b having teeth that mesh with those of the fixed clamping jaw member 18b and is pivotably attached to the lever arm so that it can self-position by rotating about the axis O1 in uniform-pressure engagement with the fixed clamping jaw member 18b.

A link member 32 of generally "L" shape and forming part of a link mechanism 34 is pivotably mounted on the frame side 10a by reception of the pin 29 in an elongated slot 32b and is pivotably coupled to the lever arm 19 by reception of a pin 31 in a hole 32c. The lever arm 19 and link mechanism 34 together form a compound lever for moving the movable clamping jaw 19a into and out of engagement with the fixed clamping jaw. A cam follower member 33 of the link mechanism 34 is pivotably attached to the link member 32 by a pin (not shown) received in holes 33a and 32a and is biassed in the direction of the arrow F1 relative to the lever arm 19 by a spring (not shown). A projection 33b on the cam follower member 33 is engageable with any one of the teeth of the ratchet wheel 15.

The inactive configuration of the clamp mechanism 14 is shown in FIG. 8A. The spring 21 (FIG. 4) holds the actuator wheel 22 in a clockwise position (arrow A2) in which the cam slot 22c retains the pin 17a of the reel-locking pawl 17 in the radially outward position, with respect to the ratchet wheel 15. The follower member 33 of the clamp link mechanism 34 is biassed to engage the main locking pawl 17, these two elements having engaging surfaces functioning as a cam and cam follower. The biassing spring of the lever arm 19 holds the movable clamping jaw 19a in spaced relation from the fixed clamping jaw 18. Accordingly, the belt 12 can be freely wound onto (arrow A2) and unwound from (arrow A1) the belt reel.

In the event of a rapid acceleration of the vehicle that causes the pawl 35b of the inertia sensor 35 to engage a ratchet tooth 28a of the inertia wheel 28 (see FIG. 8B), the inertia locking mechanism couples the reel shaft 11 to the actuating wheel 22 in the manner described above. When the belt is pulled out as the occupant is thrown forward, the rotation of the reel shaft 11 in the belt pull-out direction (arrow A1) rotates the actuating wheel 22 counterclockwise, thereby pivoting the reel-locking pawl 17 clockwise about the pin 29 by camming action of the cam slot 22c on the follower pin 17a. The reel-locking pawl 17 pushes the follower member 33 of the link 34 toward the ratchet wheel to bring the projection 33b into engagement with a tooth of the ratchet wheel 15; such engagement occurs before the reel-locking pawl 17 engages a tooth of the ratchet wheel 15 (see FIG. 8B). Upon further counterclockwise rotation of the reel shaft, the ratchet wheel 15 pushes the link mechanism 34 clockwise (arrow C1) about the mounting pin 29 and also translates it upwardly away from the ratchet wheel and somewhat toward the fixed clamping jaw 18. The link mechanism 34 in turn pivots the lever arm counterclockwise about its axle 40 (arrow D1, FIG. 8C) via the pin 31, thereby engaging the movable clamping jaw 19a with the belt 12 and clamping it to the fixed clamping jaw, whereupon the belt can no longer be withdrawn. Meanwhile, the reel-locking pawl 17 becomes fully engaged with a tooth of the main ratchet wheel 15, so the belt reel shaft 11 cannot rotate in the belt pull-out direction (arrow A1).

When the emergency condition ends, the emergency locking mechanism returns to its inactive state. The spring 21 rotates the actuating wheel clockwise, thereby moving the reel-locking pawl 17 back to its inactive position; the follower member 33 of the clamp mechanism follows the pawl 17 outwardly to reassume its inactive position (FIG. 8A). The lever arm 19 is rotated by its biassing spring back to the inactive state, thereby releasing the belt. The belt can now wind onto or be unwound from the belt reel.

The operation of the emergency locking mechanism 13 and clamp mechanism 14 of the retractor are the same as described above when the locking mechanism 13 responds to rapid acceleration of the belt reel, except that engagement of the hook member 24 with the actuator wheel 22 results from a lag in the rotation of the inertia wheel 28 (by the force of its inertia) relative to the hook carrier disc 23 rather than a stopping of the rotation of the inertia wheel 28 by the pawl 35b of the inertia sensing device 35.

Figure 9:
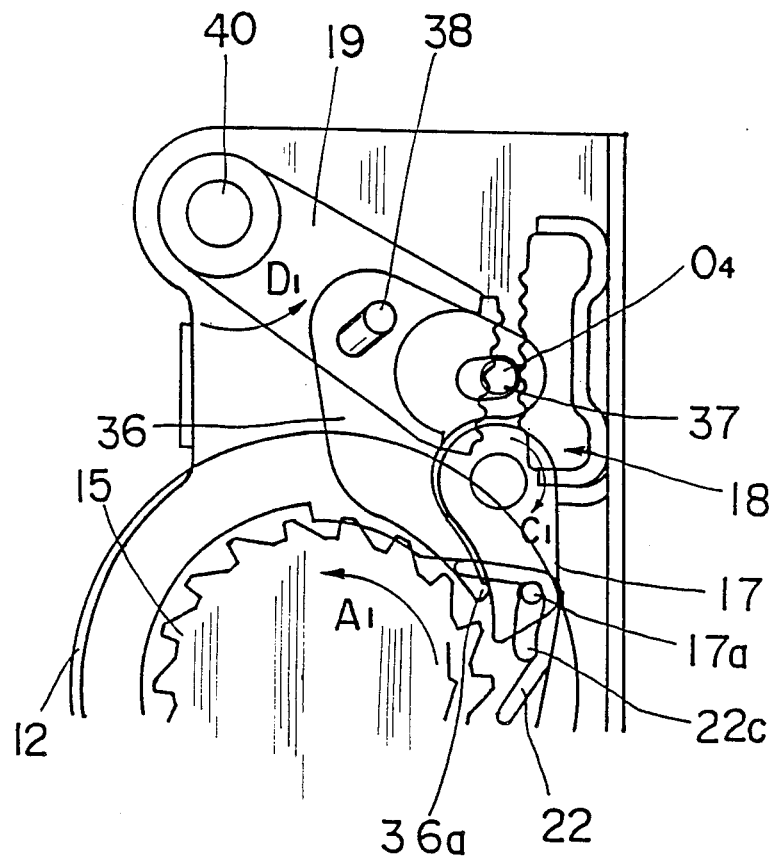
FIG. 9 is a partial side elevational view of a second embodiment.

The embodiment of FIG. 9 is the same as the embodiment of FIGS. 1 to 8, except as described immediately below, and the same reference numerals are used. Instead of a link mechanism 34 composed of a separate link member 32 and cam follower member 33, there is a one-piece link 36. The link 36 is mounted on the frame side 10a by a pin 37 at a mounting point O4 and is coupled to the lever arm 19 by a pin 38. A spring (not shown) biasses the link 36 relative to the lever arm 19 to the inactive configuration shown in FIG. 9. The elongated holes in the link allow the relative motions of the lever arm and link required by the geometry of the compound lever arrangement to engage the movable clamping jaw and the belt against the fixed clamping jaw when the projection 36a of the link 36 is engaged and moved by a tooth of the ratchet wheel 15. Such motions involve pivoting of the link about the pivot point O4 and translation away from the ratchet wheel 15 and toward the fixed clamping jaw 18. The embodiment of FIG. 9 operates in substantially the same way as the embodiment of FIGS. 1 to 8.

I claim:

1. A vehicle seat belt retractor having a frame, a belt reel rotatably mounted on the frame, an emergency locking mechanism for locking the belt reel to the frame against rotation in the belt-unwinding direction in response to rapid acceleration of the vehicle and including a reel-locking pawl pivotably mounted on the frame for engagement with a ratchet wheel affixed to the belt reel and an actuator plate coupled to the reel-locking pawl and movable in response to rotation of the belt reel in the belt-unwinding direction upon operation of the emergency locking mechanism to cause the reel-locking pawl to engage the ratchet wheel, and a belt-clamping mechanism including a fixed clamping member mounted on the frame and a movable clamping member carried on a lever arm mounted on the frame for pivotal movement between an inactive position in which the clamping members are spaced apart such that the belt can pass freely between them and a clamping position in which the movable clamping member clamps the belt against the fixed clamping member and prevents it from moving, and a link pivotably coupled to the lever arm and controlling the movements of the lever arm between the inactive and clamping positions, characterized in that the link is pivotably attached to the frame such as to form with the lever arm a compound lever, in that the link includes a projection selectively engageable with the ratchet wheel, and in that the link is resiliently biassed to engage a cam follower portion thereof with a cam surface of the reel-locking pawl such that the link is pivoted in response to movement of the reel-locking pawl into engagement with the ratchet wheel by camming action of the cam surface and cam follower portion to engage the projection of the link with the ratchet wheel, whereby the rotation of the ratchet wheel in the belt-unwinding direction causes the link to pivot about its pivot mounting on the frame and to move the lever arm and movable clamping member to the clamping position.

2. A vehicle seat belt retractor according to claim 1 and further characterized in that the actuator plate is mounted for rotation coaxially with the axis of rotation of the belt reel, in that the actuator plate includes a cam slot and in that the reel-locking pawl has a cam follower pin received in the cam slot of the actuator plate, whereby movements of the reel-locking pawl are controlled by rotational movements of the actuator plate, and in that the actuator plate is resiliently biassed in a direction to hold the reel-locking pawl out of engagement with the ratchet wheel.

3. A vehicle seat belt retractor according to claim 1 and further characterized in that the link includes a link member pivotably mounted on the frame and pivotably coupled to the lever arm and a separate cam follower member pivotably mounted on the link member and biassed relative to the link member to engage a cam follower surface thereof with the reel-locking pawl and in that the projection is a portion of the cam follower member.

4. A vehicle seat belt retractor according to claim 1 and further characterized in that the link is a unitary member and (a) is mounted on the frame to pivot and to translate toward the fixed clamping member and away from the axis of rotation of the belt reel and (b) is coupled to the lever arm to translate relative to the lever member toward the fixed clamping jaw and away from the axis of rotation of the belt reel in response to the camming action of the reel-locking pawl and rotation of the ratchet wheel.

5. A vehicle seat belt retractor according to claim 1 and further characterized in that the emergency locking mechanism is adapted to lock the reel to the frame against rotation in the belt-unwinding direction in response to rapid rotational acceleration of the belt reel.

* * * * *